United States Patent
Minoo et al.

(10) Patent No.: US 10,785,492 B2
(45) Date of Patent: Sep. 22, 2020

(54) ON REFERENCE LAYER AND SCALED REFERENCE LAYER OFFSET PARAMETERS FOR INTER-LAYER PREDICTION IN SCALABLE VIDEO CODING

(71) Applicant: ARRIS Enterprises, Inc., Suwanee, GA (US)

(72) Inventors: Koohyar Minoo, San Diego, CA (US); David M. Baylon, San Diego, CA (US); Ajay Luthra, San Diego, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 365 days.

(21) Appl. No.: 14/727,827

(22) Filed: Jun. 1, 2015

(65) Prior Publication Data
US 2015/0350662 A1  Dec. 3, 2015

Related U.S. Application Data

(60) Provisional application No. 62/010,433, filed on Jun. 10, 2014, provisional application No. 62/006,020, filed on May 30, 2014.

(51) Int. Cl.
*H04N 19/61* (2014.01)
*H04N 19/30* (2014.01)
(Continued)

(52) U.S. Cl.
CPC ........... *H04N 19/36* (2014.11); *H04N 19/105* (2014.11); *H04N 19/167* (2014.11);
(Continued)

(58) Field of Classification Search
CPC .... H04N 19/36; H04N 19/105; H04N 19/167; H04N 19/186; H04N 19/187;
(Continued)

(56) References Cited

U.S. PATENT DOCUMENTS 9,491,459 B2  11/2016  Seregin
2004/0008790 A1  1/2004  Rodriguez
(Continued)

FOREIGN PATENT DOCUMENTS

WO  2013/174254 A1  11/2013
WO  2013/184954 A2  12/2013
(Continued)

OTHER PUBLICATIONS

Kwon et al: "Reference-layer cropping offsets signaling in SHVC", 13. JCT-VC Meeting; 104. MPEG Meeting; Apr. 18-26, 2013; Incheon; (Joint"Collaborative Team on Video Coding of ISO/IEC JTC1/SC29/WG11 and ITU-T SG.16); Document No. JCTVC-M0219, Apr. 8, 2013, XP030114176" (hereinafter Kwon).*
(Continued)

*Primary Examiner* — Jamie J Atala
*Assistant Examiner* — Patrick E Demosky
(74) *Attorney, Agent, or Firm* — Chernoff, Vilhauer, McClung & Stenzel, LLP

(57) ABSTRACT

A process for determining the selection of filters and input samples is provided for scalable video coding. The process provides for re-sampling using video data obtained from an encoder or decoder process of a base layer (BL) in a multi-layer system to improve quality in Scalable High Efficiency Video Coding (SHVC). In order to provide better alignment between layers, it is proposed that reference layer offset adjustment parameters be signaled.

10 Claims, 7 Drawing Sheets

(51) Int. Cl.

| | |
|---|---|
| *H04N 19/597* | (2014.01) |
| *H04N 19/36* | (2014.01) |
| *H04N 19/186* | (2014.01) |
| *H04N 19/187* | (2014.01) |
| *H04N 19/33* | (2014.01) |
| *H04N 19/167* | (2014.01) |
| *H04N 19/70* | (2014.01) |
| *H04N 19/105* | (2014.01) |
| *H04N 19/503* | (2014.01) |
| *H04N 19/59* | (2014.01) |

(52) U.S. Cl.
CPC ......... *H04N 19/186* (2014.11); *H04N 19/187* (2014.11); *H04N 19/33* (2014.11); *H04N 19/503* (2014.11); *H04N 19/70* (2014.11); *H04N 19/59* (2014.11)

(58) Field of Classification Search
CPC ...... H04N 19/33; H04N 19/503; H04N 19/70; H04N 19/59; H04N 19/30; H04N 19/597; H04N 19/61
See application file for complete search history.

(56) References Cited

U.S. PATENT DOCUMENTS

| | | |
|---|---|---|
| 2006/0268991 A1 | 11/2006 | Segall et al. |
| 2007/0189390 A1 | 8/2007 | Pappas et al. |
| 2009/0060040 A1 | 3/2009 | Jeon et al. |
| 2009/0274214 A1 | 11/2009 | Yoon et al. |
| 2010/0226437 A1 | 9/2010 | Robertson et al. |
| 2013/0287093 A1 | 10/2013 | Hannuksela |
| 2013/0329782 A1 | 12/2013 | Seregin et al. |
| 2013/0342644 A1 | 12/2013 | Rusanovskyy |
| 2014/0064386 A1 | 3/2014 | Chen et al. |
| 2014/0098883 A1 | 4/2014 | Hannuksela |
| 2014/0177718 A1 | 6/2014 | Rusert |
| 2014/0192886 A1 | 7/2014 | François et al. |
| 2014/0168362 A1 | 8/2014 | Hannuksela |
| 2014/0218473 A1 | 8/2014 | Hannuksela |
| 2014/0254679 A1* | 9/2014 | Ramasubramonian ...................... H04N 19/597 375/240.15 |
| 2014/0269897 A1 | 9/2014 | Baylon et al. |
| 2014/0301463 A1 | 10/2014 | Rusanovskyy |
| 2014/0301488 A1 | 10/2014 | Baylon et al. |
| 2014/0321560 A1 | 10/2014 | Ugur |
| 2014/0328398 A1* | 11/2014 | Chen ...................... H04N 19/33 375/240.12 |
| 2014/0355676 A1* | 12/2014 | Seregin ................ H04N 19/513 375/240.12 |
| 2015/0110200 A1 | 4/2015 | Nakagami |
| 2015/0189298 A1 | 7/2015 | Ye |
| 2015/0195554 A1* | 7/2015 | Misra ...................... H04N 19/30 375/240.25 |
| 2015/0195574 A1 | 7/2015 | Yu et al. |
| 2015/0237376 A1 | 8/2015 | Alshina |
| 2015/0245063 A1 | 8/2015 | Rusanovskyy |
| 2015/0304665 A1 | 10/2015 | Hannuksela |
| 2015/0319447 A1 | 11/2015 | Minoo et al. |
| 2015/0319477 A1 | 11/2015 | Haberman |
| 2015/0341661 A1 | 11/2015 | Alshina et al. |
| 2016/0088303 A1* | 3/2016 | Lee ...................... H04N 19/186 375/240.12 |
| 2016/0353115 A1 | 12/2016 | Samuelsson et al. |

FOREIGN PATENT DOCUMENTS

| | | | |
|---|---|---|---|
| WO | WO 2013184954 A2 * | 12/2013 | ........... H04N 19/159 |
| WO | 2014/025741 A2 | 2/2014 | |
| WO | 2014/039547 A1 | 3/2014 | |
| WO | 2014189300 A1 | 11/2014 | |

OTHER PUBLICATIONS

Minoo et al: "Report of side activity on reference position derivation", 17. JCT-VC Meeting; Mar. 27, 2014-Apr. 4, 2014; Valencia; (Joint Collaborative Team on Video Coding of ISO/IEC JTC1/SC29/WG11 and ITU-T SG.16); Document No. JCTVC-Q0254, Apr. 3, 2014, XP030116221.*
Kwon et al: "Reference-layer cropping offsets signaling in SHVC", 13. JCT-VC Meeting; 104. MPEG Meeting; Apr. 18-26, 2013; Incheon; (Joint Collaborative Team on Video Coding of ISO/IEC JTC1/SC29/WG11 and ITU-T SG.16); Document No. JCTVC-M0219, Apr. 8, 2013, XP030114176.*
Minoo et al: "AHG13: SHVC Upsampling with phase offset adjustment", 104. MPEG Meeting; Apr. 22, 2013—260402913; Incheon; (Motion Picture Expert Group or ISO/IEC JTC1/SC29/WG11),, No. m28720, Apr. 20, 2013 (Apr. 20, 2013), XP030057253.*
PCT Search Report & Written Opinion, Re: Application No. PCT/US2015/033628; dated Sep. 17, 2015.
D-K Kwon, et al., "Reference-layer cropping offsets signaling in SHVC", 13th JCT-VC Meeting, 104th MPEG Meeting (Joint Collaborative Teach on Video Coding of ISO/IEC JTC1/SC29/WG11 and ITU-T SG.16), Apr. 8, 2013.
J. Chen, et a., "MV-HEVC/SHVC HLS: On signaling of scaled reference offset", 5th JCT-3V Meeting (The Joint Collaborative Team on 3D Video Coding Extension Development of ISO/IEC JTC1/SC29/WG11 and ITU-T SG.16), Jul. 16, 2013.
K. Minoo, et al., "Report of side activity on reference position derivation", 17th JCT-VC Meeting (Joint Collaborative Teach on Video Coding of ISO/IEC JTC1/SC29/WG11 and ITU-T SG.16), Apr. 3, 2014.
PCT Search Report & Written Opinion, Re: Application #PCT/US2014/033704, dated Jun. 30, 2014.
J. Chen, et al., "Description of scalable video coding technology proposal by Qualcomm (configuration 2)" 11th JCT-VC Meeting; 102. MPEG Meeting; Oct. 2, 2012, 22 pgs.
B. Bross, et al., "High Efficiency Video Coding (HEVC) text specification draft 8", 10th JCT-VC Meeting; 101. MPEG Meeting; Jul. 23, 2012, 286 pgs.
S-W Park, et al., "Intra BL pred. & phase shift", 15th JVT Meeting; 72. MPEG Meeting; Apr. 16, 2005, 16 pgs.
J Dong, et al., "Upsampling based on sampling grid information for aligned inter layer prediction", 13th JCT-VC Meeting; 104; MPEG Meeting; Apr. 8, 2013, 10 pgs.
K. Minoo, et al., "AHG13: SHVC Upsampling with phase offset adjustment", 13th JCT-VC Meeting; 104. MPEG Meeting; Apr. 11, 2013, 8 pgs.
K. Minoo, et al., "Non SCE1: on handling resampling phase offsets with fixed filters" 14th JCT-VC meeting, Jul. 26, 2013, 6 pgs.
Andersson, K. et al., "Fix for the computation of scaling factors used in inter-layer prediction", Joint Collaborative Team on Video Coding (JCT-VC)of ITU-T SG 16 WP 3 and ISO/IEC JTC 1/SC 29/WG 11, 17th Meeting: Valencia, ES, Mar. 27-Apr. 4, 2014. Document JCTVC-Q0104.
Chen, J., et al., "High efficiency video coding (HEVC) scalable extensions Draft 5", Joint Collaborative Team on Video Coding (JCT-VC) of ITU-T SG 16 WP 3 and ISO/IEC JTC 1/SC 29/WG 11, 16th Meeting: San José, US, Jan. 9-17, 2014. Document JCTVC-P1008_v4.
U.S. Appl. No. 14/702,007, filed May 1, 2015.
K. Minoo, et al, "Re-sampling with phase offset adjustment and signaling using phase index re-mapping," (U.S. Appl. No. 61/923,450, filed Jan. 3, 2014.
K. Minoo, et al., "SCE1: Results of Test 2.2 on phase compensation by signaling filter coefficients at PPS with sample shift", JCTVC-N0078, 14th JCT-VC Meeting, Vienna AT, Jul. 2013, 4 pgs.
K. Minoo, et al., "On handling re-sampling phase offsets with fixed filters", JCTVC-P0177-R1, 16th JCT-VC Meeting, San Jose, US, Jan. 2014, 6 pgs.
G.J. Sullivan, et al., "Standardized Extensions of High Efficiency Video Coding (HEVC)", IEEE Journal of Selected Topics in Signal Processing, vol. 8, No. 6, Dec. 1, 2013, pp. 1001-1016.

(56) References Cited

OTHER PUBLICATIONS

K. Minoo, et al., "Increased resolution for scaled reference layer offset", 17th JCT-VC Meeting (Joint Collaborative Team on Video Coding of ISO/IEC JTC1/SC29/WG11 and ITU-T SG.16), Mar. 27, 2014.
Y. Ye, et al., "SHVC HLS: On picture level resampling phase filter selection", 17th JCT-VC Meeting (Joint Collaborative Team on Video Coding of ISO/IEC JTC1/SC29/WG11 and ITU-T SG.16), Mar. 18, 2014.
PCT Search Report & Written Opinion, Re: Application No. PCT/US2015/021341, dated Jun. 25, 2015.
PCT Invitation to Pay Additional Fees (Form ISA/206), Re: Application No. PCT/US2015/028828, dated Jul. 21, 2015.
"High Efficiency Video Coding", Series H. Audiovisual and Multimedia Systems. Infrastructure of audiovisual services-Coding of Moving Video, ITU-T Telecommunication Standardization Sector of ITU, H.265, Apr. 2013, 317 pgs.
K. Minoo, et al., "Scalable video coding using increased resolution for scaled reference layer offset", (U.S. Appl. No. 61/955,123), filed Mar. 18, 2014.
K. Minoo, et al., "Specification of scaled reference layer in scalable video coding", (U.S. Appl. No. 61/972,162, filed Mar. 28, 2014.
E. Alshina, "AHG13: Re-sampling process with generic phase", 18th JCT-VC Meeting (Joint Collaborative Team on Video Coding of ISO/IEC JTC1/SC29/WG11 and ITU-T SG16), Jul. 2, 2014.
J. Boyce, "BoG Report on SHVC upsampling process and phase offset", 17th JCT-VC Meeting (Joint Collaborative Team on Video Coding of ISO/IEC JTC1/SC29/WG11 and ITU-T SG16), Apr. 3, 2014.
PCT Search Report & Written Opinion, Re: Application No. PCT/US2015/028828, dated Sep. 29, 2015.
Boyce, "Conditional SPS Extension Syntax for RExt, SHVC, and MV-HEVC", JVC-VC Meeting; Oct. 23, 2013-Jan. 11, 2013; Geneva, Joint Collaborative Team on Video Coding of ISO/IEC JTC1/SC29/WG11 and ITU-T SG.16.
Bross, B., et al., "High Efficiency Video Coding (HEVC) text specification draft 10 (for FDIS & Last Call)," Document of Joint Collaborative Team on Video Coding, JCTVC-L1003_v34, 12th Meeting: Geneva, CH, Jan. 14-23, 2013.
Flynn, D., et al., "High Efficiency Video Coding (HEVC) Range Extensions text specification: Draft 4," JCTVC-N1005_v3, Aug. 2013.
Gerhard T., et al, "MV-HEVC Draft Text 6," Joint Collaborative Team on 3D Video Coding Extension Development ITU-T SG 16 WP 3 and ISO/IEC JTC 1/SC 29/WG 11, 6th Meeting: Geneva, JCT3V-F1004-v6, Nov. 2013.
Yu, Y., et al., "Some Syntax Modifications for HEVC Range Extension", Joint Collaborative Team on Video Coding Extensions of ITU-T SG 16 WP3 & ISO/IEC JTC VSC 29/WG11, JCTVC-P0166, Jan. 2014.
PCT International Search Report and Written Opinion, PCT/US2014/072695, dated Mar. 31, 2015.
Flynn, D., et al., "High Efficiency Video Coding (HEVC) Range Extensions text specification: Draft 5", Joint Collaborative Team on Video Coding Extensions of ITU-T SG 16 WP3 & ISO/IEC JTC VSC 29/WG11, JCTVC-O1005_v1, Apr. 2013.

\* cited by examiner

ON REFERENCE LAYER AND SCALED REFERENCE LAYER OFFSET PARAMETERS FOR INTER-LAYER PREDICTION IN SCALABLE VIDEO CODING

CROSS REFERENCE TO RELATED APPLICATION

This application claims priority under 35 U.S.C. § 119(e) from earlier filed U.S. Provisional Application Ser. No. 62/006,020 filed on May 30, 2014 and U.S. Provisional Application Ser. No. 62/010,433 filed on Jun. 10, 2014, both of which are incorporated herein by reference in its entirety.

TECHNICAL FIELD

The present invention relates to a sampling filter process for scalable video coding. More specifically, the present invention relates to re-sampling using video data obtained from an encoder or decoder process, where the encoder or decoder process can be MPEG-4 Advanced Video Coding (AVC) or High Efficiency Video Coding (HEVC). Further, the present invention specifically relates to Scalable HEVC (SHVC) that includes a two layer video coding system.

BACKGROUND

Scalable video coding (SVC) refers to video coding in which a base layer (BL), sometimes referred to as a reference layer, and one or more scalable enhancement layers (EL) are used. For SVC, the base layer can carry video data with a base level of quality. The one or more enhancement layers can carry additional video data to support higher spatial, temporal, and/or signal-to-noise SNR levels. Enhancement layers may be defined relative to a previously coded layer.

The base layer and enhancement layers can have different resolutions. Upsampling filtering, sometimes referred to as resampling filtering, may be applied to the base layer in order to match a spatial aspect ratio or resolution of an enhancement layer. This process may be called spatial scalability. An upsampling filter set can be applied to the base layer, and one filter can be chosen from the set based on a phase (sometimes referred to as a fractional pixel shift). The phase may be calculated based on the ratio between base layer and enhancement layer picture resolutions.

SUMMARY

Embodiments of the present invention provide methods, devices and systems for the upsampling process from BL resolution to EL resolution to implement the upsampling of FIG. 2. The upsampling process of embodiments of the present invention includes three separate modules, a first module to select input samples from the BL video signal, a second module to select a filter for filtering the samples, and a third module using phase filtering to filter the input samples to recreate video that approximates the EL resolution video. The filters of the third module can be selected from a set of fixed filters each with different phase. In these modules, the selection of the input samples and filters for generating the output samples are determined based upon a mapping between the EL sample positions and the corresponding BL sample positions. The embodiments included herein are related to the mapping or computation between the EL and the BL sample positions.

BRIEF DESCRIPTION OF THE DRAWINGS

Further details of the present invention are explained with the help of the attached drawings in which.

DETAILED DESCRIPTION

Figure 1:
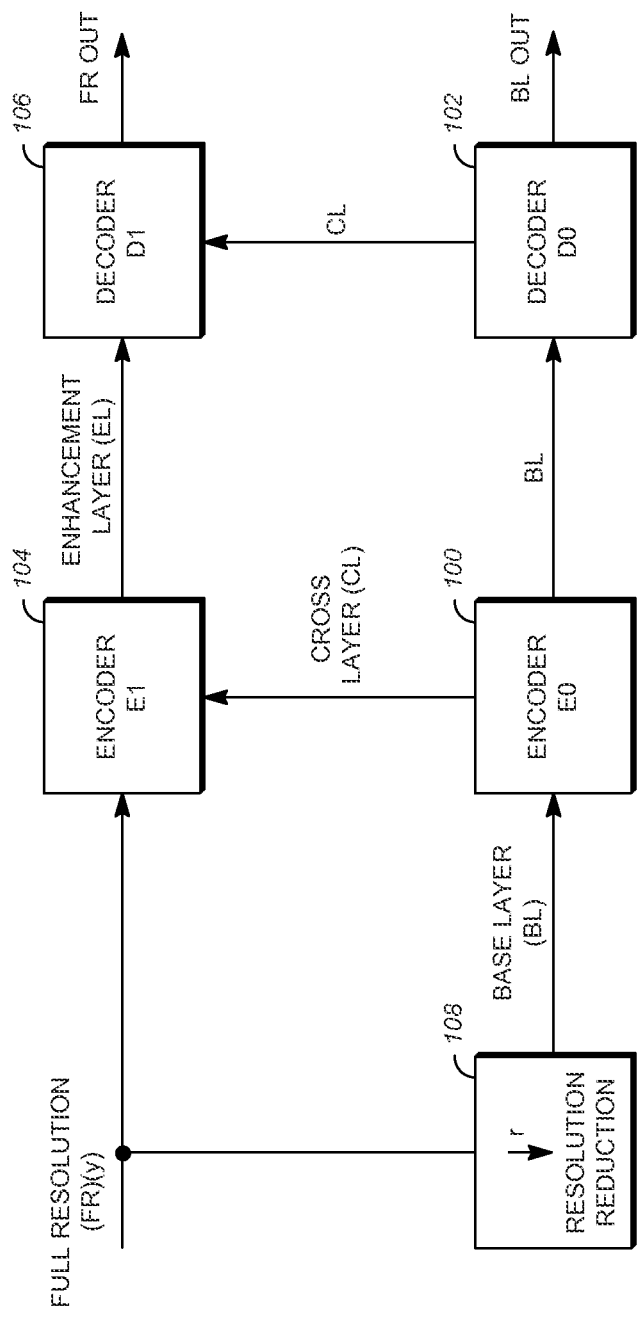
FIG. 1 is a block diagram of components in a scalable video coding system with two layers.

An example of a scalable video coding system using two layers is shown in FIG. 1. In the system of FIG. 1, one of the two layers is the Base Layer (BL) where a BL video is encoded in an Encoder E0, labeled 100, and decoded in a decoder D0, labeled 102, to produce a base layer video output BL out. The BL video is typically at a lower quality than the remaining layers, such as the Full Resolution (FR) layer that receives an input FR (y). The FR layer includes an encoder E1, labeled 104, and a decoder D1, labeled 106. In encoding in encoder E1 104 of the full resolution video, cross-layer (CL) information from the BL encoder 100 is used to produce enhancement layer (EL) information. The corresponding EL bitstream of the full resolution layer is then decoded in decoder D1 106 using the CL information from decoder D0 102 of the BL to output full resolution video, FR out. By using CL information in a scalable video coding system, the encoded information can be transmitted more efficiently in the EL than if the FR was encoded independently without the CL information. An example of coding that can use two layers shown in FIG. 1 includes video coding using AVC and the Scalable Video Coding (SVC) extension of AVC, respectively. Another example that can use two layer coding is HEVC.

FIG. 1 further shows block 108 with a down-arrow r illustrating a resolution reduction from the FR to the BL to illustrate that the BL can be created by a downsampling of the FR layer data. Although a downsampling is shown by the arrow r of block 108 FIG. 1, the BL can be independently created without the downsampling process. Overall, the down arrow of block 108 illustrates that in spatial scalability, the base layer BL is typically at a lower spatial resolution than the full resolution FR layer. For example, when r=2 and the FR resolution is 3840×2160, the corresponding BL resolution is 1920×1080.

The cross-layer CL information provided from the BL to the FR layer shown in FIG. 1 illustrates that the CL information can be used in the coding of the FR video in the EL. In one example, the CL information includes pixel information derived from the encoding and decoding process of the BL. Examples of BL encoding and decoding are AVC and HEVC. Because the BL pictures are at a different spatial resolution than the FR pictures, a BL picture needs to be upsampled (or re-sampled) back to the FR picture resolution in order to generate a suitable prediction for the FR picture.

Figure 2:
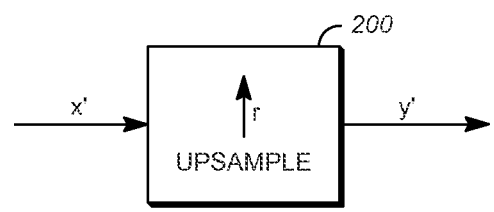
FIG. 2 illustrates an upsampling process that can be used to convert the base layer data to the full resolution layer data for FIG. 1.

FIG. 2 illustrates an upsampling process in block 200 of data from the BL layer to the EL. The components of the upsampling block 200 can be included in either or both of the encoder E1 104 and the decoder D1 106 of the EL of the video coding system of FIG. 1. The BL data at resolution x that is input into upsampling block 200 in FIG. 2 is derived from one or more of the encoding and decoding processes of the BL. A BL picture is upsampled using the up-arrow r process of block 200 to generate the EL resolution output y' that can be used as a basis for prediction of the original FR input y.

The upsampling block 200 works by interpolating from the BL data to recreate what is modified from the FR data. For instance, if every other pixel is dropped from the FR in block 108 to create the lower resolution BL data, the dropped pixels can be recreated using the upsampling block 200 by interpolation or other techniques to generate the EL resolution output y' from upsampling block 200. The data y' is then used to make encoding and decoding of the EL data more efficient.

I. Overview of Upsampling Circuitry

Figure 3:
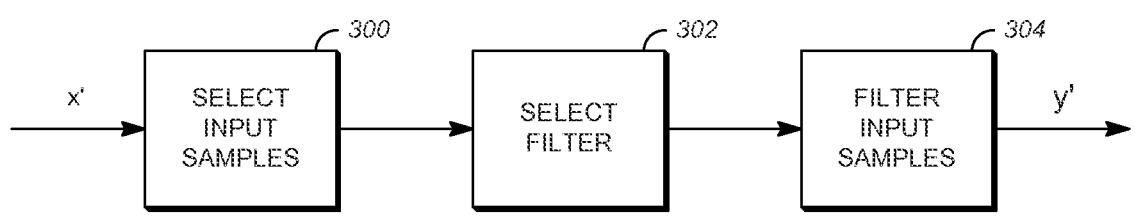
FIG. 3 shows a block diagram of components for implementing the upsampling process of FIG. 2.

FIG. 3 shows a general block diagram for implementing an upsampling process of FIG. 2 for embodiments of the present invention. The upsampling or re-sampling process can be determined to minimize an error E (e.g. mean-squared error) between the upsampled data y' and the full resolution data y. The system of FIG. 3 includes a select input samples module 300 that samples an input video signal. The system further includes a select filter module 302 to select a filter from the subsequent filter input samples module 304 to upsample the selected input samples from module 300.

In module 300, a set of input samples in a video signal x is first selected. In general, the samples can be a two-dimensional subset of samples in x, and a two-dimensional filter can be applied to the samples. The module 302 receives the data samples in x from module 300 and identifies the position of each sample from the data it receives, enabling module 302 to select an appropriate filter to direct the samples toward a subsequent filter module 304. The filter in module 304 is selected to filter the input samples, where the selected filter is chosen or configured to have a phase corresponding to the particular output sample location desired.

The filter input samples module 304 can include separate row and column filters. The selection of filters is represented herein as filters h[n; p], where the filters can be separable along each row or column, and p denotes a phase index selection for the filter. The output of the filtering process using the selected filter h[n;p] on the selected input samples produces output value y'.

Figure 4:
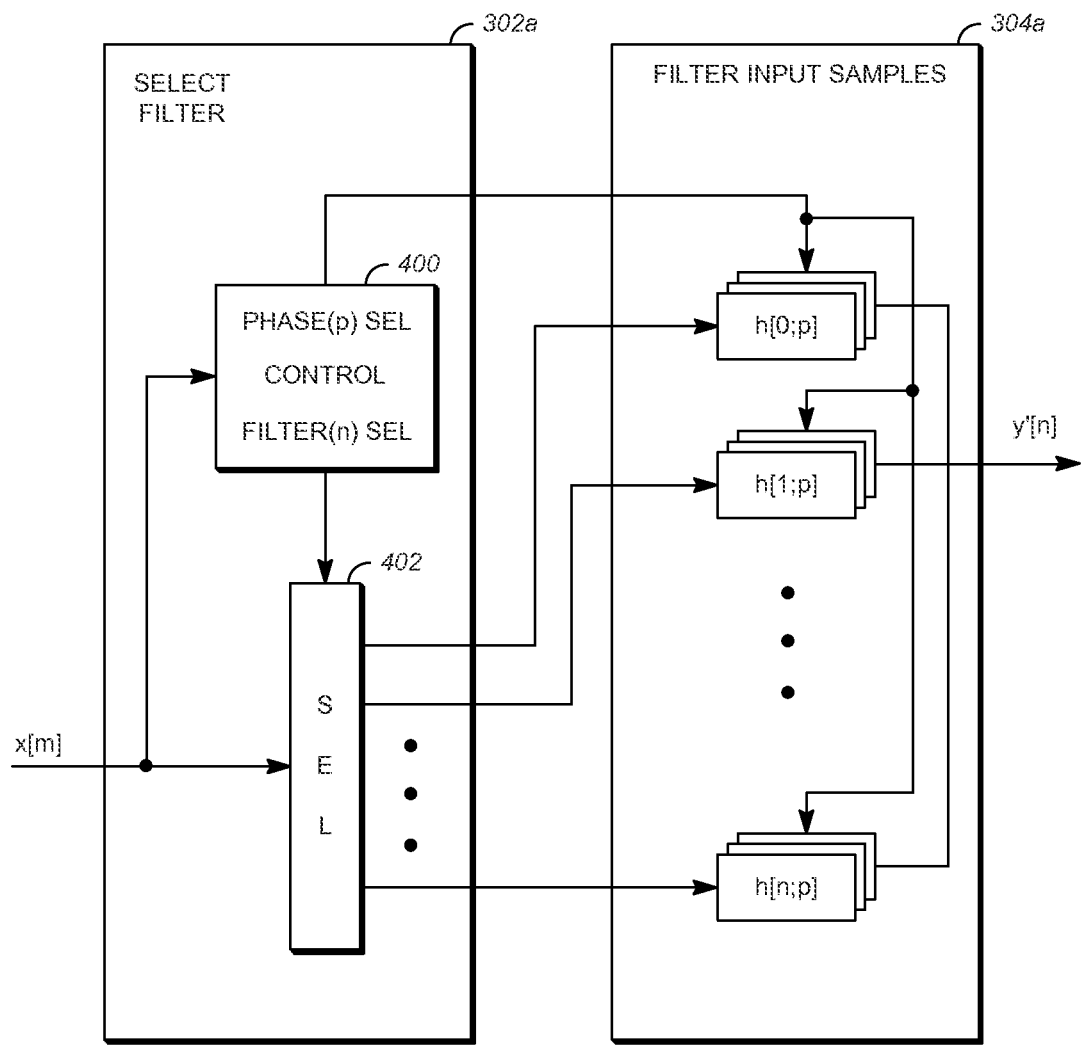
FIG. 4 shows components of the select filter module and the filters, where the filters are selected from fixed or adaptive filters to apply a desired phase shift.

FIG. 4 shows details of components for the select sample module 302 of FIG. 3 (labeled 302a in FIG. 4) and the filters module 304 of FIG. 3 (labeled 304a in FIG. 4) for a system with fixed filters. For separable filtering the input samples can be along a row or column of data. To supply a set of input samples from select input samples module 300, the select filter module 302a includes a select control 400 that identifies the input samples x[m] and provides a signal to a selector 402 that directs them through the selector 402 to a desired filter. The filter module 304a then includes the different filters h[n;p] that can be applied to the input samples, where the filter phase can be chosen among P phases from each row or column element depending on the output sample m desired. As shown, the selector 402 of module 302a directs the input samples to a desired column or row filter in 304a based on the "Filter (n) SEL" signal from select control 400. A separate select control 400 signal "Phase (p) SEL" selects the appropriate filter phase p for each of the row or column elements. The filter module 304a output produces the output y'[n].

In FIG. 4, the outputs from individual filter components h[n;p] are shown added "+" to produce the output y'[n]. This illustrates that each box, e.g. h[0;p], represents one coefficient or number in a filter with phase p. Therefore, the filter with phase p is represented by all n+1 numbers in h[0,p], h[n;p]. This is the filter that is applied to the selected input samples to produce an output value y'[n], for example, y'[0]=h[0,p]*x[0]+h[1,p]*x[1]+ . . . +h[n,p]*x[n], requiring the addition function "+" as illustrated. As an alternative to adding in FIG. 4, the "+" could be replaced with a solid connection and the output y'[n] would be selected from one output of a bank of P filters representing the p phases, with the boxes h[n:p] in module 304a relabeled, for example, as h[n;0], h[n,1], h[n,p−1] and now each box would have all the filter coefficients needed to form y'[n] without the addition element required.

II. Existing Syntax for Signaling Scaled Reference Layer Offsets

In order to accommodate for offset and phase shift differences between the BL and EL samples, phase offset adjustment parameters can be signaled to achieve the desired correspondence between the layers. Let a sample location relative to the top-left sample in the current EL picture be (xP, yP), and a sample location in the BL reference layer in units of 1/16-th sample relative to the top-left sample of the BL be (xRef16, yRef16). In J. Chen, J. Boyce, Y. Ye, M. Hannuksela, G. Sullivan, Y. Wang, "High efficiency video coding (HEVC) scalable extension Draft 5," JCTVC-P1008_v4, January 2014, the relationship between (xRef16, yRef16) and (xP, yP) is given as follows:

xRef16=(((xP−offsetX)*ScaleFactorX+addX+ (1<<11))>>12)−(phaseX<<2)

yRef16=(((yP−offsetY)*ScaleFactorY+addY+ (1<<11))>>12)−(phaseY<<2)

The sample position (xRef16, yRef16) is used to select the input samples and the filters used in computing the output sample values as specified in J. Chen, J. Boyce, Y. Ye, M. Hannuksela. G. Sullivan, Y. Wang, "High efficiency video coding (HEVC) scalable extension Draft 5," JCTVC-P1008_v4, January 2014.

The variables offsetX, addX, offsetY, and addY specify scaled reference layer offset and phase parameters in the horizontal and vertical directions, variables phaseX and phaseY specify reference layer phase offset parameters in the horizontal and vertical directions, and variables ScaleFactorX and ScaleFactorY are computed based on the ratio of the reference layer to the scaled reference layer width and height. These variables are computed based upon phase offset parameters specified in J. Chen, J. Boyce, Y. Ye, M. Hannuksela, G. Sullivan, Y. Wang, "High efficiency video coding (HEVC) scalable extension Draft 5," JCTVC-P1008_v4. January 2014. In particular, the offset parameters offsetX and offsetY are computed as:

offsetX=ScaledRefLayerLeftOffset/((cIdx==0)?1:Sub-WidthC)

offsetY=ScaledRefLayerTopOffset/((cIdx==0)?1:Sub-HeightC)

where variable cIdx specifies the color component index and the values SubWidthC and SubHeightC are specified depending on the chroma format sampling structure and
ScaledRefLayerLeftOffset=scaled_ref_layer_left_offset
[rLId]<<1
ScaledRefLayerTopOffset=scaled_ref_layer_top_offset
[rLId]<<1
ScaledRefLayerRightOffset=scaled_ref_layer_right_offset
[rLId]<<1
ScaledRefLayerBottomOffset=scaled_ref_layer_bottom_
offset[rLId]<<1
where rLId specifies the scaled reference layer picture Id.
The variables ScaledRefLayerLeftOffset, ScaledRefLayer-
TopOffset, ScaledRefLayerRightOffset, and ScaledRefLay-
erBottomOffset specify offsets in two pixel unit resolution
based on the values of the syntax elements scaled_ref_lay-
er_left_offset[rLId], scaled_ref_layer_top_offset[rLId],
scaled_ref_layer_right_offset[rLId], and scaled_ref_
layer_bottom_offset[rLId].

In U.S. Provisional Patent Application No. 62/661,867, (hereinafter referred to as the "'215") incorporated by reference in its entirety, syntax elements for scaled reference layer offsets are included in the bitstream syntax at the PPS level (PPS multilayer extension) as shown in Table 1.

TABLE 1

Existing syntax for signaling offsets at PPS multilayer extension.

| | Descriptor |
|---|---|
| pps_multilayer_extension( ) { | |
|   num_scaled_ref_layer_offsets | ue(v) |
|   for( i = 0; i < num_scaled_ref_layer_offsets; i++) { | |
|     scaled_ref_layer_id[ i ] | u(6) |
|     scaled_ref_layer_left_offset[ scaled_ref_layer_id[ i ] ] | se(v) |
|     scaled_ref_layer_top_offset[ scaled_ref_layer_id[ i ] ] | se(v) |
|     scaled_ref_layer_right_offset[ scaled_ref_layer_id[ i ] ] | se(v) |
|     scaled_ref_layer_bottom_offset[ scaled_ref_layer_id[ i ] ] | se(v) |
|     scaled_ref_layer_left_phase[ scaled_ref_layer_id[ i ] ] | se(v) |
|     scaled_ref_layer_top_phase[ scaled_ref_layer_id[ i ] ] | se(v) |
|     ref_layer_horizontal_delta[ scaled_ref_layer_id[ i ] ] | se(v) |
|     ref_layer_vertical_delta[ scaled_ref_layer_id[ i ] ] | se(v) |
|     ref_layer_horizontal_delta_chroma [ scaled_ref_layer_id[ i ] ] | ue(v) |
| ] | |
|     ref_layer_vertical_delta_chroma [ scaled_ref_layer_id[ i ] ] | ue(v) |
|   } | |
|   scaled_ref_layer_left_phase_chroma | ue(v) |
|   scaled_ref_layer_top_phase_chroma | ue(v) |
| } | |

In Table 1, num_scaled_ref_layer_offsets indicates the number of sets of scaled reference layer offset parameters for which offsets are signaled, and scaled_ref_layer_id[i] specifies the nuh_layer_id value of the associated inter-layer picture for which offsets are specified.

In J. Chen, J. Boyce, Y. Ye, M. Hannuksela, G. Sullivan, Y. Wang, "High efficiency video coding (HEYC) scalable extension Draft 5," JCTVC-P1008_v4, January 2014, the syntax elements are defined as follows:

scaled_ref_layer_left_offset[scaled_ref_layer_id[i]] specifies the horizontal offset between the top-left luma sample of the associated inter-layer picture with nuh_layer_id equal to scaled_ref_layer_id[i] and the top-left luma sample of the current picture in units of two luma samples. When not present, the value of scaled_ref_layer_left_offset [scaled_ref_layer_id[i]] is inferred to be equal to 0.

scaled_ref_layer_top_offset[scaled_ref_layer_id[i]] specifies the vertical offset between the top-left luma sample of the associated inter-layer picture with nuh_layer_id equal to scaled_ref_layer_id[i] and the top-left luma sample of the current picture in units of two luma samples. When not present, the value of scaled_ref_layer_top_offset[scaled_ref_layer_id[i]] is inferred to be equal to 0.

scaled_ref_layer_right_offset[scaled_ref_layer_id[i]] specifies the horizontal offset between the bottom-right luma sample of the associated inter-layer picture with nuh_layer_id equal to scaled_ref_layer_id[i] and the bottom-right luma sample of the current picture in units of two luma samples. When not present, the value of scaled_ref_layer_right_offset[scaled_ref_layer_id[i]] is inferred to be equal to 0.

scaled_ref_layer_bottom_offset[scaled_ref_layer_id[i]] specifies the vertical offset between the bottom-right luma sample of the associated inter-layer picture with nuh_layer_id equal to scaled_ref_layer_id[i] and the bottom-right luma sample of the current picture in units of two luma samples. When not present, the value of scaled_ref_layer_bottom_offset[scaled_ref_layer_id[i]] is inferred to be equal to 0.

In '215, additional offsets are signaled to increase the resolution for proper BL and EL alignment at the PPS level in order to accommodate other applications and operations such as interlace/progressive scalability and pan and scan. The following additional phase offset adjustment parameters in Table 1 are signaled.

scaled_ref_layer_left_phase[scaled_ref_layer_id[i]] specifies the horizontal luma offset between nuh_layer_id equal to scaled_ref_layer_id[i] and the current picture in units of ½ luma samples. This is a signed value between −2 to +2. When not present, the value of scaled_ref_layer_left_phase[scaled_ref_layer_id[i]] is inferred to be equal to 0.

scaled_ref_layer_top_phase[scaled_ref_layer_id[i]] specifies the vertical luma offset between nuh_layer_id equal to scaled_ref_layer_id[i] and the current picture in units of ½ luma samples. This is a signed value between −2 to +2. When not present, the value of scaled_ref_layer_top_phase[scaled_ref_layer_id[i]] is inferred to be equal to 0.

ref_layer_horizontal_delta[scaled_ref_layer_id[i]] specifies the horizontal luma offset between nuh_layer_id equal to scaled_ref_layer_id[i] and the current picture in units of ⅛ luma samples. This is a signed value between −8 to 8. When not present, the value of ref_layer_horizontal_delta [scaled_ref_layer_id[i]] is inferred to be equal to 0.

ref_layer_vertical_delta[scaled_ref_layer_id[i]] specifies the vertical luma offset between nuh_layer_id equal to scaled_ref_layer_id[i] and the current picture in units of ⅛ luma samples. This is a signed value between −8 to +8. When not present, the value of ref_layer_vertical_delta [scaled_ref_layer_id[i]] is inferred to be equal to 0.

ref_layer_horizontal_delta_chroma[scaled_ref_layer_id [i]] specifies the horizontal offset between the chroma samples and luma samples in nuh_layer_id equal to scaled_ref_layer_id[i] in units of ¼ luma samples. This is an unsigned value between 0 to 4. When not present, the value of ref_layer_horizontal_delta_chroma[scaled_ref_layer_id [i]] is inferred to be equal to 2.

ref_layer_vertical_delta_chroma[scaled_ref_layer_id[i]] specifies the vertical offset between the chroma samples and luma samples in nuh_layer_id equal to scaled_ref_layer_id [i] in units of ¼ luma samples. This is an unsigned value between 0 to 4. When not present, the value of ref_layer_vertical_delta chroma [scaled_ref_layer_id[i]] is inferred to be equal to 2.

scaled_ref_layer_left_phase_chroma specifies the horizontal chroma offset relative to luma in units of ¼ luma samples. This is an unsigned value between 0 to 4. When not present, the value of scaled_ref_layer_left_phase chroma is inferred to be equal to 2.

scaled_ref_layer_top_phase_chroma specifies the vertical chroma offset relative to luma in units of ¼ luma samples. This is an unsigned value between 0 to 4. When not present, the value of scaled_ref_layer_top_phase chroma is inferred to be equal to 2.

The additional syntax elements are used to provide finer alignment between the layers. One example of the use of the syntax is as follows:

ScaledRefLayerLeftPhase=scaled_ref_layer_left_phase [rLId]
ScaledRefLayerTopPhase=scaled_ref_layer_top_phase [rLId]
RefLayerHorizontalDelta=ref_layer horizontal_delta [rLId]
RefLayerVerticalDelta=ref_layer_vertical_delta [rLId]
RefLayerHorizontalDeltaChroma=ref_layer_horizontal_ delta_chroma [rLId]
RefLayerVerticalDeltaChroma=ref_layer_vertical_delta chroma [rLId]
phaseX=(cIdx==0)?(ScaledRefLayerLeftPhase<<2): (ScaledRefLayerLeftPhase<<1+scaled_ref_layer_ left_phase_chroma)
phaseY=(cIdx==0)?(ScaledRefLayerTopPhase<<2): (ScaledRefLayerTopPhase<<1+scaled_ref_layer_ top_phase chroma)
deltaX=(cIdx==0)?(RefLayerHorizontalDelta<<1):(Re fLayerHorizontalDelta+RefLayerHorizontalDeltaCh roma<<1)
deltaY=(cIdx==0)?(RefLayerVerticalDelta<<1):(Re fLayerVerticalDelta+RefLayerVerticalDeltaCh roma<<1)
addX=(ScaleFactorX*phaseX+4)>>3
addY=(ScaleFactorY*phaseY+4)>>3
xRef16=(((xP−offsetX)*ScaleFactorX+addX+ (1<<11))>>12)−deltaX
yRef16=(((yP−offsetY)*ScaleFactorY+addY+ (1<<11))>>12)−deltaY The scaled reference layer phase offset parameters scaled_ref_layer_left_phase, scaled_ref_layer_ left_phase_chroma, scaled_ref_layer_top_phase, and scaled_ref_layer_top_phase chroma provide additional independent finer level or resolution over the previous scaled reference layer phase offset parameters, e.g. scaled_ref_layer_left_offset and scaled_ref_layer_top_offset. In addition, the reference layer phase offset parameters ref_layer_horizontal_delta, ref_layer_vertical_delta, ref_layer_horizontal_delta_chroma and ref_layer_vertical_delta_chroma provide finer reference layer phase offset resolution.

III. Embodiments Including Syntax for Signaling Scaled Reference Layer and Reference Layer Offsets An alternative approach to specify the alignment and offset between layers is given using the syntax elements in Table 2. The syntax disclosed herein provides flexibility and options in signaling offsets for alignment.

TABLE 2

Proposed syntax for signaling offsets at PPS multilayer extension.

| | Descriptor |
|---|---|
| pps_multilayer_extension( ) { | |
|   inter_view_mv_vert_constraint_flag | u(1) |
|   num_scaled_ref_layer_offsets | ue(v) |
|   for( i = 0; i < num_scaled_ref_layer_offsets; i++) { | |
|     scaled_ref_layer_id[ i ] | u(6) |
|     scaled_ref_layer_left_offset[ scaled_ref_layer_id[ i ] ] | se(v) |
|     scaled_ref_layer_top_offset[ scaled_ref_layer_id[ i ] ] | se(v) |

TABLE 2-continued

Proposed syntax for signaling offsets at PPS multilayer extension.

| | Descriptor |
|---|---|
|     scaled_ref_layer_right_offset[ scaled_ref_layer_id[ i ] ] | se(v) |
|     scaled_ref_layer_bottom_offset[ scaled_ref_layer_id[ i ] ] | se(v) |
|     scaled_ref_layer_left_phase[ scaled_ref_layer_id[ i ] ] | u(1) |
|     scaled_ref_layer_top_phase[ scaled_ref_layer_id[ i ] ] | u(1) |
|   } | |
|   num_ref_layer_offsets | ue(v) |
|   for( i = 0; i < num_ref_layer_offsets; i++) { | |
|     ref_layer_id[ i ] | u(6) |
|     ref_layer_left_offset[ ref_layer_id[ i ] ] | se(v) |
|     ref_layer_top_offset[ ref_layer_id[ i ] ] | se(v) |
|     ref_layer_right_offset[ ref_layer_id[ i ] ] | se(v) |
|     ref_layer_bottom_offset[ ref_layer_id[ i ] ] | se(v) |
|     ref_layer_horizontal_phase[ ref_layer_id[ i ] ] | u(1) |
|     ref_layer_vertical_phase[ ref_layer_id[ i ] ] | u(1) |
|     ref_layer_horizontal_chroma_position[ref_layer_id[ i ] ] | u(2) |
|     ref_layer_vertical_chroma_position[ref_layer_id[ i ] ] | u(2) |
|   } | |
|   scaled_ref_layer_left_phase_chroma_position | u(2) |
|   scaled_ref_layer_top_phase_chroma_position | u(2) |
| } | |

In Table 2, num_scaled_ref_layer_offsets indicates the number of sets of scaled reference layer offset parameters for which offsets are signaled, scaled_ref_layer_id[i] (srLId) specifies the nuh_layer_id value of the associated inter-layer picture for which scaled reference layer offsets are specified, num_ref_layer_offsets indicates the number of sets of reference layer offset parameters for which offsets are signaled, and ref_layer_id[i] (rLId) specifies the nuh_layer_id value of the associated inter-layer picture for which reference layer offsets are specified.

The scaled reference layer and reference layer offsets are specified as follows for the decoded pictures, where SubWidthC and SubHeightC represent scaled reference layer chroma subsampling parameters in the horizontal and vertical directions, respectively (e.g. SubWidthC=SubHeightC=2 for 4:2:0 chroma sampling), and RefLayerSubWidthC and RefLayerSubHeightC represent reference layer chroma subsampling parameters in the horizontal and vertical directions, respectively (e.g. RefLayerSubWidthC=RefLayerSubHeightC=2 for 4:2:0 chroma sampling):

scaled_ref_layer_left_offset[scaled_ref_layer_id[i]] specifies the horizontal offset between the top-left luma sample of the associated inter-layer picture with nuh_layer_id equal to scaled_ref_layer_id[i] and the top-left luma sample of the current picture in units of SubWidthC luma samples. When not present, the value of scaled_ref_layer_left_offset[scaled_ref_layer_id[i]] is inferred to be equal to 0.

scaled_ref_layer_top_offset[scaled_ref_layer_id[i]] specifies the vertical offset between the top-left luma sample of the associated inter-layer picture with nuh_layer_id equal to scaled_ref_layer_id[i] and the top-left luma sample of the current picture in units of SubHeightC luma samples. When not present, the value of scaled_ref_layer_top_offset[scaled_ref_layer_id[i]] is inferred to be equal to 0.

scaled_ref_layer_right_offset[scaled_ref_layer_id[i]] specifies the horizontal offset between the bottom-right luma sample of the associated inter-layer picture with nuh_layer_id equal to scaled_ref_layer_id[i] and the bottom-right luma sample of the current picture in units of SubWidthC luma samples. When not present, the value of scaled_ref_layer_right_offset[scaled_ref_layer_id[i]] is inferred to be equal to 0.

scaled_ref_layer_bottom_offset[scaled_ref_layer_id[i]] specifies the vertical offset between the bottom-right luma sample of the associated inter-layer picture with nuh_layer_id equal to scaled_ref_layer_id[i] and the bottom-right luma sample of the current picture in units of SubHeightC luma samples. When not present, the value of scaled_ref_layer_bottom_offset[scaled_ref_layer_id[i]] is inferred to be equal to 0.

scaled_ref_layer_left_phase[scaled_ref_layer_id[i]] specifies the horizontal luma offset between nuh_layer_id equal to scaled_ref_layer_id[i] and the current picture in units of ½ luma samples. When this flag is not present, the value of scaled_ref_layer_left_phase[scaled_ref_layer_id[i]] is inferred to be equal to 0.

scaled_ref_layer_top_phase[scaled_ref_layer_id[i]] specifies the vertical luma offset between nuh_layer_id equal to scaled_ref_layer_id[i] and the current picture in units of ½ luma samples. When this flag is not present, the value of scaled_ref_layer_top_phase[scaled_ref_layer_id[i]] is inferred to be equal to 0.

ref_layer_left_offset[ref_layer id[i]] specifies the horizontal offset between the top-left luma sample of the reference region on the reference picture with nuh_layer_id equal to ref_layer_id[i] and the top-left luma sample of the reference picture in units of RefLayerSubWidthC luma samples. When not present, the value of ref_layer_left_offset[ref_layer_id[i]] is inferred to be equal to 0.

ref_layer_top_offset[ref_layer_id[i]] specifies the vertical offset between the top-left luma sample of the reference region on the reference picture with nuh_layer_id equal to ref_layer_id[i] and the top-left luma sample of the reference picture in units of RefLayerSubHeightC luma samples. When not present, the value of ref_layer_top_offset[ref_layer_id[i]] is inferred to be equal to 0.

ref_layer_right_offset[ref_layer_id[i]] specifies the horizontal offset between the bottom-right luma sample of the reference region on the reference picture with nuh_layer_id equal to ref_layer_id[i] and the bottom-right luma sample of the reference picture in units of RefLayerSubWidthC luma samples. When not present, the value of ref_layer_right_offset[ref_layer_id[i]] is inferred to be equal to 0.

ref_layer_bottom_offset[ref_layer_id[i]] specifies the vertical offset between the bottom-right luma sample of the reference region on the reference picture with nuh_layer_id equal to scaled_ref_layer_id[i] and the bottom-right luma sample of the reference picture in units of RefLayerSubHeightC luma samples. When not present, the value of ref_layer_bottom_offset[ref_layer_id[i]] is inferred to be equal to 0.

ref_layer_horizontal_phase[ref_layer_id[i]] specifies the horizontal luma offset between nuh_layer_id equal to ref_layer_id[i] and the current picture in units of ¼ luma samples. This is an unsigned value with 2 bits. When not present, the value of ref_layer_horizontal_phase[ref_layer_id[i]] is inferred to be equal to 0.

ref_layer_vertical_phase[ref_layer_id[i]] specifies the vertical luma offset between nuh_layer_id equal to ref_layer_id[i] and the current picture in units of ¼ luma samples. This is an unsigned value with 2 bits. When not present, the value of ref_layer_vertical_phase[ref_layer_id[i]] is inferred to be equal to 0.

ref_layer_horizontal_chroma_position[ref_layer_id[i]] specifies the horizontal offset between the chroma samples and luma samples in nuh_layer_id equal to ref_layer_id[i] in units of ¼ luma samples. This is an unsigned value with 2 bits. When not present, the value of ref_layer_horizontal_chroma_position[ref_layer_id[i]] is inferred to be equal to 0.

ref_layer_vertical_chroma_position[ref_layer_id[i]] specifies the vertical offset between the chroma samples and luma samples in nuh_layer_id equal to ref_layer_id[i] in units of ¼ luma samples. This is an unsigned value with 2 bits. When not present, the value of ref_layer_vertical_chroma_position [ref_layer_id[i]] is inferred to be equal to 2.

scaled_ref_layer_left_phase_chroma_position specifies the horizontal chroma offset relative to luma in units of ¼ luma samples. This is an unsigned value. When not present, the value of scaled_ref_layer_left_phase_chroma_postion is inferred to be equal to 0.

scaled_ref_layer_top_phase_chroma_position specifies the vertical chroma offset relative to luma in units of ¼ luma samples. This is an unsigned value. When not present, the value of scaled_ref_layer_top_phase_chroma_position is inferred to be equal to 2.

An example of the use of the syntax elements for determining the alignment between layers is given by the following calculations, where it is assumed that the scaled_ref_layer_id and the ref_layer_id of associated inter-layer picture are the same:

The variables ScaledRefLayerLeftOffset, ScaledRefLayerTopOffset, ScaledRefLayerRightOffset and ScaledRefLayerBottomOffset are derived as follows:
ScaledRefLayerLeftOffset=scaled_ref_layer_left_offset[rLId]*SubWidthC
ScaledRefLayerTopOffset=scaled_ref_layer_top_offset[rLId]*SubHeightC
ScaledRefLayerRightOffset=scaled_ref_layer_right_offset[rLId]*SubWidthC
ScaledRefLayerBottomOffset=scaled_ref_layer_bottom_offset[rLId]*SubHeightC The variables RefLayerLeftOffset, RefLayerTopOffset, RefLayerRightOffset and RefLayerBottomOffset are derived as follows:
RefLayerLeftOffset=ref_layer_left_offset[rLId]*RefLayerSubWidthC
RefLayerTopOffset=ref_layer_top_offset[rLId]*RefLayerSubHeightC
RefLayerRightOffset=ref_layer_right_offset[rLId]*RefLayerSubWidthC
RefLayerBottomOffset=ref_layer_bottom_offset[rLId]*RefLayerSubHeightC The variables ScaledRefLayerPicWidthInSamplesY and ScaledRefLayerPicHeightInSamplesY are derived as follows, where CurPicWidthInSamplesY and CurPicHeightInSamplesY are the width and height, respectively, of the current decoded picture in luma samples:
ScaledRefLayerPicWidthInSamplesY=CurPicWidthInSamplesY−ScaledRefLayerLeftOffset−ScaledRefLayerRightOffset
ScaledRefLayerPicHeightInSamplesY=CurPicHeightInSamplesY−ScaledRefLayerTopOffset−ScaledRefLayerBottomOffset In one embodiment, the variables RefLayerPicWidthInSamplesY and RefLayerPicHeightInSamplesY are the width and height, respectively, of the current decoded reference layer picture in luma samples, and variables RefLayerRefRegionWidthInSamplesY and RefLayerRefRegionHeightInSamplesY are the width and height, respectively, of the reference region on the decoded reference layer picture rlPic in units of luma samples, respectively, and are derived as follows:
RefLayerRegionWidthInSamplesY=RefLayerPicWidthInSamplesY−RefLayerLeftOffset−RefLayerRightOffset
RefLayerRegionHeightInSamplesY=RefLayerPicHeightInSamplesY−RefLayerTopOffset−RefLayerBottomOffset The variables ScaleFactorX and ScaleFactorY are derived as follows:

ScaleFactorX=((RefLayerRefRegionWidthInSamplesY<<16)+(ScaledRefLayerPicWidthInSamplesY>>1))/ScaledRefLayerPicWidthInSamplesY ScaleFactorY=((RefLayerRefRegionHeightInSamplesY<<16)+(ScaledRefLayerPicHeightInSamplesY>>1))/ScaledRefLayerPicHeightInSamplesY In order to provide finer alignment for luma and chroma, the following phase offset variables are determined:

The variables ScaledRefLayerLeftPhase, ScaledRefLayerTopPhase, RefLayerHorizontalPhase, RefLayerVerticalPhase, RefLayerHorizontalChromaPhase, and RefLayerVerticalChromaPhase are derived as follows:

ScaledRefLayerLeftPhase=scaled_ref_layer_left_phase [rLId]

ScaledRefLayerTopPhase=scaled_ref_layer_top_phase [rLId]

RefLayerHorizontalPhase=ref_layer_horizontal_phase [rLId]

RefLayerVerticalPhase=ref_layer_vertical_phase [rLId]

RefLayerHorizontalChromaPhase=ref_layer_horizontal_chroma_position [rLId]

RefLayerVerticalChromaPhase=ref_layer_vertical_chroma_position [rLId]

The variables offsetX and offsetY are derived as follows:
offsetX=ScaledRefLayerLeftOffset/((cIdx==0)?1:SubWidthC)
offsetY=ScaledRefLayerTopOffset/((cIdx==0)?1:SubHeightC)

The variables addX and addY, deltaX and deltaY are derived as follows, where cIdx indicates the color component index (e.g. cIdx=0 for luma, and cIdx=1 for chroma):

If cIdx is equal to 0, the following applies:
addX=(ScaleFactorX*ScaledRefLayerLeftPhase+1)>>1)
addY=(ScaleFactorY*ScaledRefLayerTopPhase+1)>>1)
deltaX=(RefLayerLeftOffset<<4)−RefLayerHorizontalPhase<<2
deltaY=(RefLayerTopOffset<<4)−RefLayerVerticalPhase<<2

Otherwise (cIdx is equal to 1), the following applies:
addX=(ScaleFactorX*(ScaledRefLayerLeftPhase<<1+scaled_ref_layer_left_phase_chromaposition)+SubWidthC<<1)>>(1+SubWidthC)
addY=(ScaleFactorY*(ScaledRefLayerTopPhase<<1+scaled_ref_layer_top_phase_chroma_position)+SubHeightC<<1)>>(1+SubHeightC)
deltaX=((RefLayerLeftOffset<<2)−(RefLayerHorizontalPhase+RefLayerHorizontalChromaPhase))<<(3−RefLayerSubWidthC)
deltaY=((RefLayerTopOffset<<2)−(RefLayerVerticalPhase+RefLayerVerticalChromaPhase))<<(3−RefLayerSubHeightC)

The variables xRef16 and yRef16 for specifying the corresponding alignment between the layers are derived as follows:
xRef16=(((xP−offsetX)*ScaleFactorX+addX+(1<<11))>>12)+deltaX
yRef16=(((yP−offsetY)*ScaleFactorY+addY+(1<<11))>>12)+deltaY In the equations above, offsetX and offsetY represent coarse components of the scaled reference alignment and addX and addY represent fine components.

The equations above for reference layer offsets deltaX and deltaY each have two components, a coarse component (e.g. RefLayerLeftOffset) and a fine component (e.g. RefLayerHorizontalPhase). It is possible to constrain these offsets to have only a coarse or fine component. In one embodiment, for example, setting RefLayerHorizontalPhase=0 and RefLayerVerticalPhase=0 for the cIdx=0 case results in the following equations for deltaX and deltaY:
deltaX=(RefLayerLeftOffset<<4)
deltaY=(RefLayerTopOffset<<4)

In one embodiment, for example, setting RefLayerHorizontalPhase=0, RefLayerHorizontalChromaPhase=0, RefLayerVerticalPhase=0, and RefLayerVerticalChromaPhase=0 for the cIdx=1 case yields the following equations for deltaX and deltaY:
deltaX=(RefLayerLeftOffset<<2)<<(3−RefLayerSubWidthC)
deltaY=(RefLayerTopOffset<<2)<<(3−RefLayerSubHeightC)

Figure 5A:
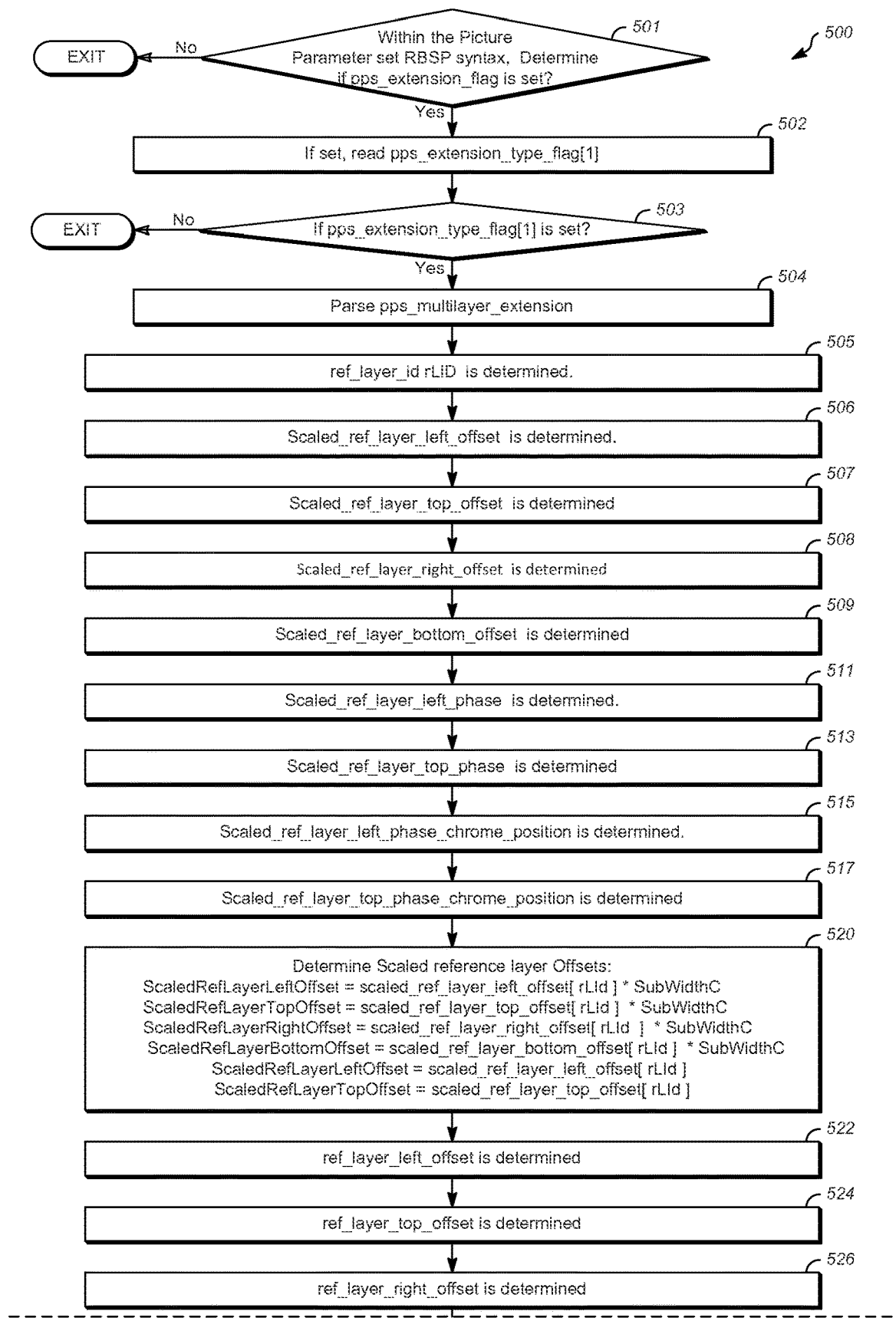
FIGS. 5A, 5B, and 5C are a simplified flow chart showing the process for determining the reference layer location based upon the syntax used in a method for coding scalable video.
Figure 5B:
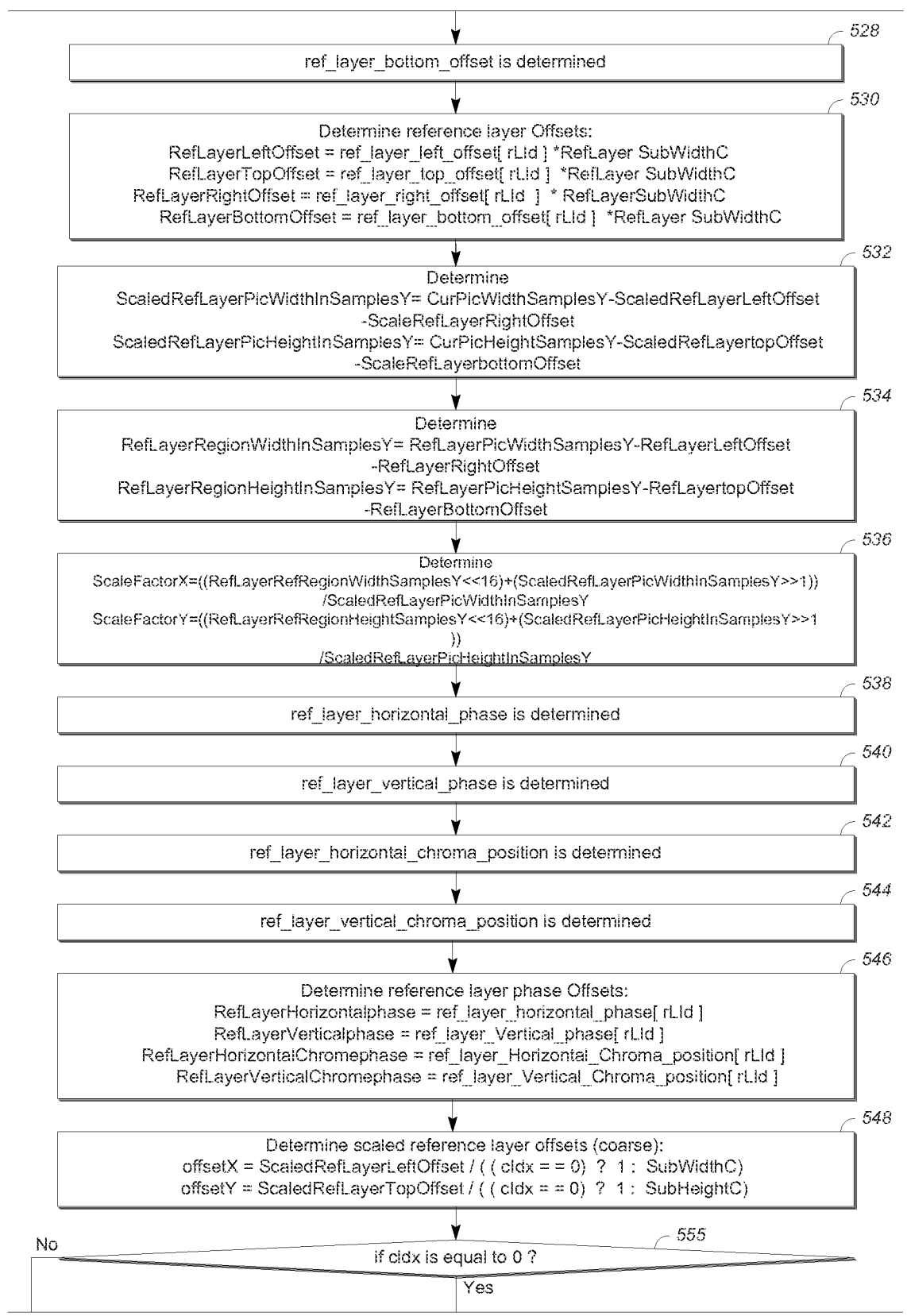
Figure 5C:
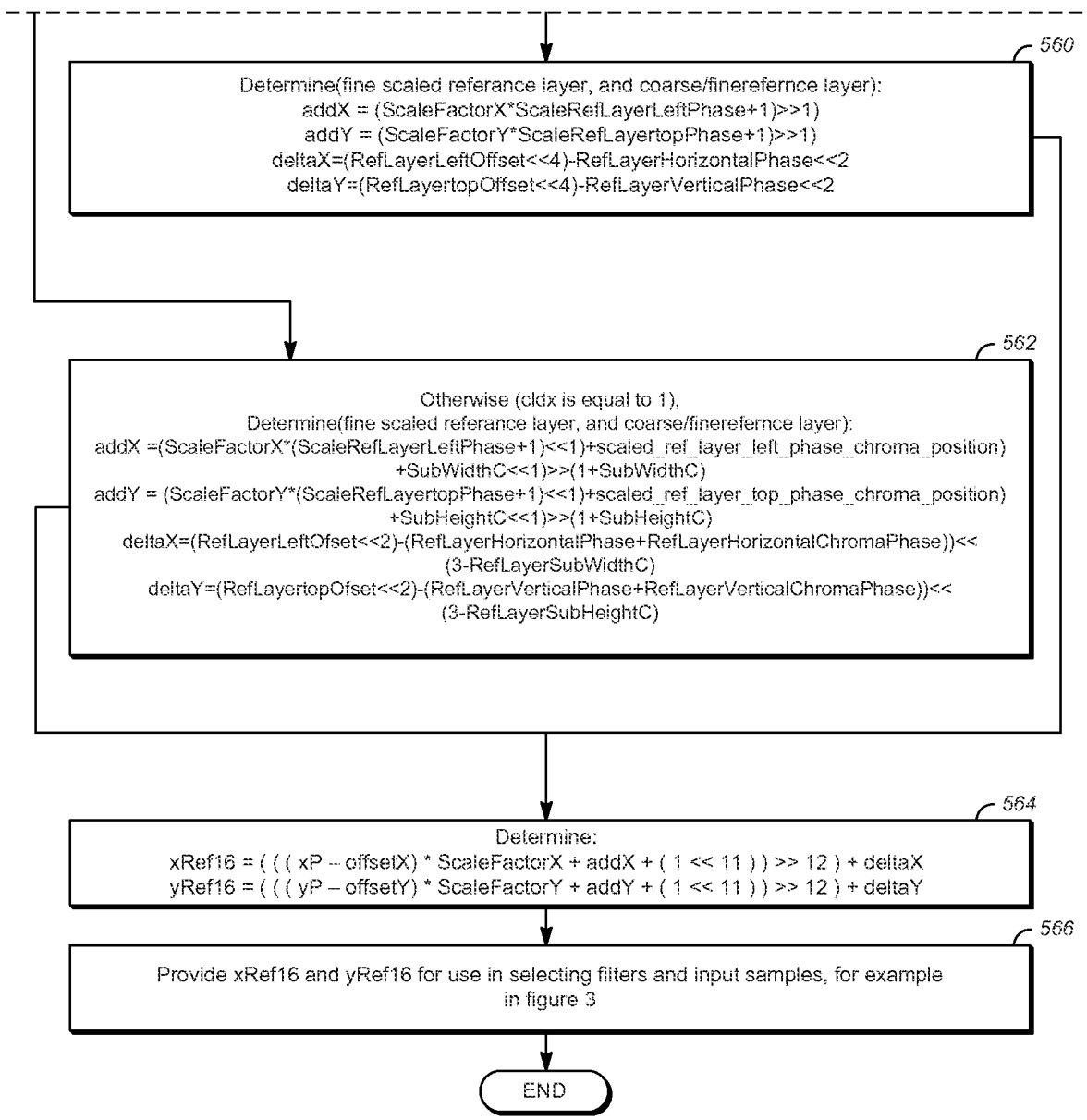

FIGS. 5A, 5B, and 5C show a flow chart illustrating one example of a method 500 for coding scalable video. The method disclosed herein is applicable to both encoders and decoders. In the case of an encoder, the encoder would signal (e.g. transmit or write to bitstream), and in the case of a decoder, the decoder would parse the bitstream to determine the syntax element.

At block 501 within the Picture Parameter set RBSP syntax, determine if the pps_extension_flag is set. At 502, the PPS multilayer extension flag is read or examined to determine if the pps_multilayer_extension should be parsed. In some cases, for example, when using an encoder, this step is referred to as signaling. It is understood that in the case of an encoder or encoding, the corresponding encoder-appropriate terminology is assumed. At 503, if pps_extension_type_flag[1] is set, specifying that the pps_multilayer_extension syntax structure is present, the method proceeds 504 to the pps_multilayer_extension and the rest of the steps after 503 are processed.

At block 505, ref_layer_id rLId is determined. Continuing to block 506, scaled_ref_layer_left_offset is determined. At block 507, scaled_ref_layer_top_offset is determined. Next, at block 508, scaled_ref_layer_right_offset is determined.

At block 509, scaled_ref_layer_bottom_offset is determined.

At block 511, scaled_ref_layer_left_phase is determined.
At block 513, scaled_ref_layer_top_phase is determined.
At block 515, scaled_ref_layer_left_phase_chroma_position is determined.
At block 517, scaled_ref_layer_top_phase_chroma_position is determined.

Next, at block 520, scaled reference layer offsets are determined using:
ScaledRefLayerLeftOffset=scaled_ref_layer_left_offset[rLId]*SubWidthC
ScaledRefLayerTopOffset=scaled_ref_layer_top_offset[rLId]*SubHeightC
ScaledRefLayerRightOffset=scaled_ref_layer_right_offset[rLId]*SubWidthC
ScaledRefLayerBottomOffset=scaled_ref_layer_bottom_offset[rLId]*SubHeightC
ScaledRefLayerLeftPhase=scaled_ref_layer_left_phase[rLId]
ScaledRefLayerTopPhase=scaled_ref_layer_top_phase[rLId]

At block 522, ref_layer_left_offset is determined.
At block 524, ref_layer_top_offset is determined.
At block 526, ref_layer_right_offset is determined.
At block 528, ref_layer_bottom_offset is determined.
At block 530, Determine reference layer offsets:
RefLayerLeftOffset=ref_layer_left_offset[rLId]*RefLayerSubWidthC
RefLayerTopOffset=ref_layer_top_offset[rLId]*RefLayerSubHeightC RefLayerRightOffset=ref_layer_right_offset[rLId]*RefLayerSubWidthC
RefLayerBottomOffset=ref_layer_bottom_offset[rLId]*RefLayerSubHeightC At block 532, Determine:
ScaledRefLayerPicWidthInSamplesY=CurPicWidthInSamplesY−ScaledRefLayerLeftOffset−ScaledRefLayerRightOffset
ScaledRefLayerPicHeightInSamplesY=CurPicHeightInSamplesY−ScaledRefLayerTopOffset−ScaledRefLayerBottomOffset At block 534, Determine:
RefLayerRegionWidthInSamplesY=RefLayerPicWidthInSamplesY RefLayerLeftOffset−RefLayerRightOffset
RefLayerRegionHeightInSamplesY=RefLayerPicHeightInSamplesY RefLayerTopOffset−RefLayerBottomOffset At block 536, Determine:
ScaleFactorX=((RefLayerRefRegionWidthInSamplesY<<16)+(ScaledRefLayerPicWidthInSamplesY>>1))/ScaledRefLayerPicWidthInSamplesY
ScaleFactorY=((RefLayerRefRegionHeightInSamplesY<<16)+(ScaledRefLayerPicHeightInSamplesY>>1)) ScaledRefLayerPicHeightInSamplesY At block 538, ref_layer_horizontal_phase is determined
At block 540, ref_layer_vertical_phase is determined.
At block 542, ref_layer_horizontal_chroma_position is determined.
At block 544, ref_layer_vertical_chroma_position is determined.
At block 546, determine reference layer phase offsets using:
RefLayerHorizontalPhase=ref_layer_horizontal_phase [rLId]
RefLayerVerticalPhase=ref_layer_vertical_phase [rLId]
RefLayerHorizontalChromaPhase=ref_layer_horizontal_chroma_position [rLId]
RefLayerVerticalChromaPhase=ref_layer_vertical_chroma_position [rLId]

At block 548, Determine scaled reference layer offsets (coarse) using:
offsetX=ScaledRefLayerLeftOffset/((cIdx==0)?1:SubWidthC)
offsetY=ScaledRefLayerTopOffset/((cIdx==0)?1:SubHeightC)

At block 555, determine if cIdx is equal to 0, and if so, then:
At block 560, determine (fine scaled reference layer, and coarse/fine reference layer) using:
addX=(ScaleFactorX*ScaledRefLayerLeftPhase+1)>>1)
addY=(ScaleFactorY*ScaledRefLayerTopPhase+1)>>1)
deltaX=(RefLayerLeftOffset<<4)−RefLayerHorizontalPhase<<2
deltaY=(RefLayerTopOffset<<4)−RefLayerVerticalPhase<<2

Otherwise, determine if cIdx is not equal to 0, (cIdx is equal to 1), advance to block 562, and determine (fine scaled reference layer, and coarse/fine reference layer):
addX=(ScaleFactorX*(ScaledRefLayerLeftPhase<<1+scaled_ref_layer_left_phase_chroma_position)+SubWidthC<<1)>>(1+SubWidthC)
addY=(ScaleFactorY (ScaledRefLayerTopPhase<<1 scaled_ref_layer_top_phase_chroma_position)+SubHeightC<<1)>>(1+SubHeightC)
deltaX=((RefLayerLeftOffset<<2)−(RefLayerHorizontalPhase+RefLayerHorizontalChromaPhase))<<(3−RefLayerSubWidthC)
deltaY=((RefLayerTopOffset<<2) (RefLayerVerticalPhase+RefLayerVerticalChromaPhase))<<(3−RefLayerSubHeightC)

continuing on to block 564, determine:
xRef16=(((xP−offsetX)*ScaleFactorX+addX+(1<<11))>>12)+deltaX
yRef16=(((yP−offsetY)*ScaleFactorY+addY+(1<<11))>>12)+deltaY Finally, at block 566, provide xRef16 and yRef16 for use in selecting filters and input samples, for example in FIG. 3.

Illustrative Operating Environment

Figure 6:
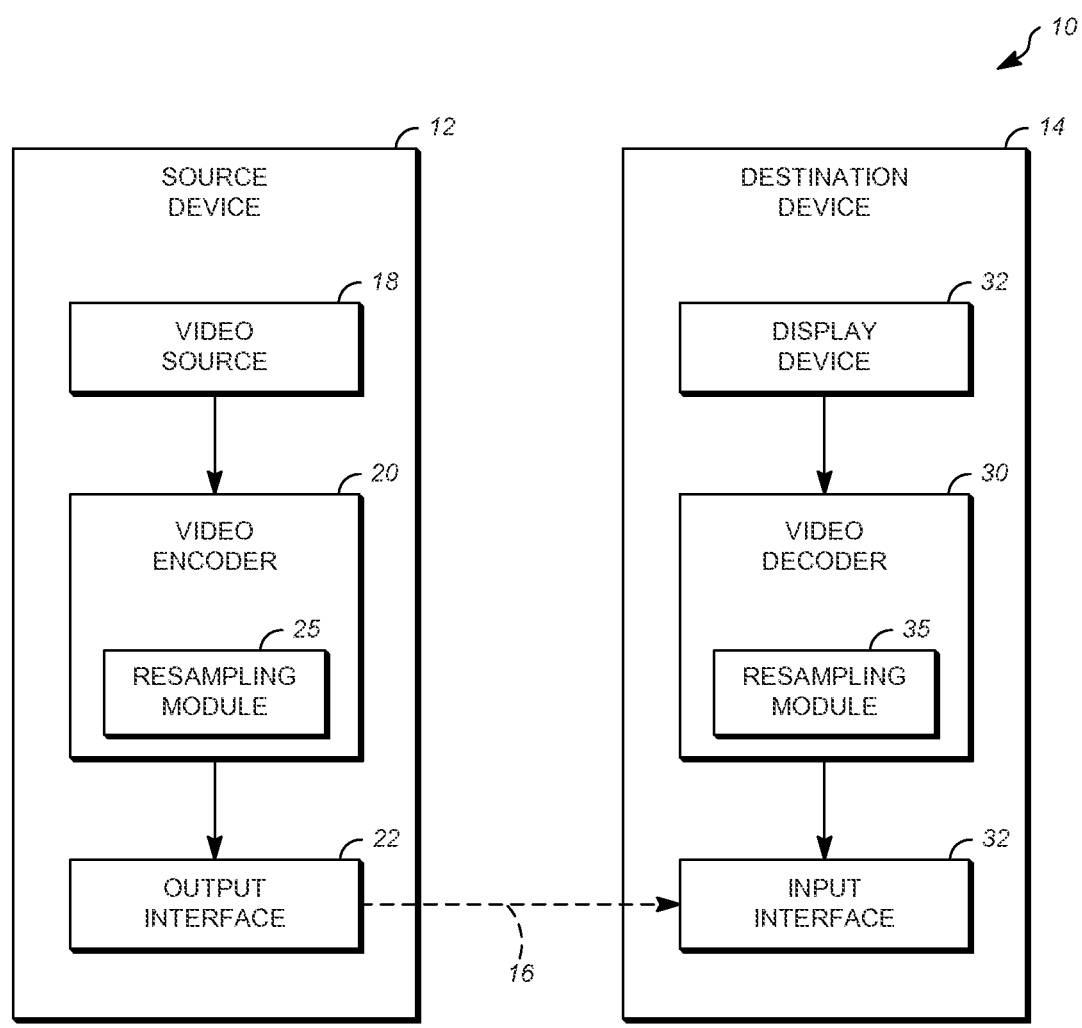
FIG. 6 is a simplified block diagram that illustrates an example video coding system.

FIG. 6 is a simplified block diagram that illustrates an example video coding system 10 that may utilize the techniques of this disclosure. As used described herein, the term "video coder" can refer to either or both video encoders and video decoders. In this disclosure, the terms "video coding" or "coding" may refer to video encoding and video decoding.

As shown in FIG. 6, video coding system 10 includes a source device 12 and a destination device 14. Source device 12 generates encoded video data. Accordingly, source device 12 may be referred to as a video encoding device. Destination device 14 may decode the encoded video data generated by source device 12. Accordingly, destination device 14 may be referred to as a video decoding device. Source device 12 and destination device 14 may be examples of video coding devices.

Destination device 14 may receive encoded video data from source device 12 via a channel 16. Channel 16 may comprise a type of medium or device capable of moving the encoded video data from source device 12 to destination device 14. In one example, channel 16 may comprise a communication medium that enables source device 12 to transmit encoded video data directly to destination device 14 in real-time.

In this example, source device 12 may modulate the encoded video data according to a communication standard, such as a wireless communication protocol, and may transmit the modulated video data to destination device 14. The communication medium may comprise a wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or other equipment that facilitates communication from source device 12 to destination device 14. In another example, channel 16 may correspond to a storage medium that stores the encoded video data generated by source device 12.

In the example of FIG. 6, source device 12 includes a video source 18, video encoder 20, and an output interface 22. In some cases, output interface 22 may include a modulator/demodulator (modem) and/or a transmitter. In source device 12, video source 18 may include a source such as a video capture device, e.g., a video camera, a video archive containing previously captured video data, a video feed interface to receive video data from a video content provider, and/or a computer graphics system for generating video data, or a combination of such sources.

Video encoder 20 may encode the captured, pre-captured, or computer-generated video data. The encoded video data may be transmitted directly to destination device 14 via output interface 22 of source device 12. The encoded video data may also be stored onto a storage medium or a file server for later access by destination device 14 for decoding and/or playback.

In the example of FIG. 6, destination device 14 includes an input interface 28, a video decoder 30, and a display device 32. In some cases, input interface 28 may include a receiver and/or a modem. Input interface 28 of destination device 14 receives encoded video data over channel 16. The encoded video data may include a variety of syntax elements generated by video encoder 20 that represent the video data. Such syntax elements may be included with the encoded video data transmitted on a communication medium, stored on a storage medium, or stored a file server.

Display device 32 may be integrated with or may be external to destination device 14. In some examples, destination device 14 may include an integrated display device and may also be configured to interface with an external display device. In other examples, destination device 14 may be a display device. In general, display device 32 displays the decoded video data to a user.

Video encoder 20 includes a resampling module 25 which may be configured to code (e.g., encode) video data in a scalable video coding scheme that defines at least one base layer and at least one enhancement layer. Resampling module 25 may resample at least some video data as part of an encoding process, wherein resampling may be performed in an adaptive manner using resampling filters. Likewise, video decoder 30 may also include a resampling module 35 similar to the resampling module 25 employed in the video encoder 20.

Video encoder 20 and video decoder 30 may operate according to a video compression standard, such as the High Efficiency Video Coding (HEVC) standard. The HEVC standard is being developed by the Joint Collaborative Team on Video Coding (JCT-VC) of ITU-T Video Coding Experts Group (VCEG) and ISO/IEC Motion Picture Experts Group (MPEG). A recent draft of the HEVC standard is described in Recommendation ITU-T H.265| International Standard ISO/IEC 23008-2, High efficiency video coding, version 2, October 2014.

Additionally or alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard or technique. Other examples of video compression standards and techniques include MPEG-2, ITU-T H.263 and proprietary or open source compression formats and related formats.

Video encoder 20 and video decoder 30 may be implemented in hardware, software, firmware or any combination thereof. For example, the video encoder 20 and decoder 30 may employ one or more processors, digital signal processors (DSPs), application specific integrated circuits (ASICs), field programmable gate arrays (FPGAs), discrete logic, or any combinations thereof. When the video encoder 20 and decoder 30 are implemented partially in software, a device may store instructions for the software in a suitable, non-transitory computer-readable storage medium and may execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Also, it is noted that some embodiments have been described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

Although the subject matter has been described in language specific to structural features and/or methodological acts, it is to be understood that the subject matter defined in the appended claims is not necessarily limited to the specific features or acts described above.

What is claimed:

1. A video coding method implemented in a scalable video coding system for deriving a current picture in a bitstream of coded pictures, the method comprising:

receiving a first coding layer carrying video with a base resolution, receiving a second coding layer carrying video with an enhanced resolution having a higher resolution than the base resolution, a sample luma location xP, yP representing a position relative to a top-left sample in a current picture, said current picture is an enhancement layer picture having the enhanced resolution;

parsing the bitstream for location offset values signaled individually per reference layer picture in the first coding layer and signaled individually per enhancement layer picture in the second coding layer, the location offsets including, offsets between luma samples of a reference region in the reference layer picture and luma samples of the same reference layer picture and a corresponding enhancement layer picture, respectively; and using the xP, yP luma location relative to a top-left luma sample of the current picture and the signaled reference layer picture and enhancement layer offset values to derive a corresponding xRef16, yRef16 luma location relative to the top-left luma sample of the reference layer picture, the luma location xRef16, yRef16 representing a luma location in the reference layer picture having the base resolution, location xRef16, yRef16 is a position in the reference layer picture relative to a top-left luma sample of the reference layer picture;

wherein the corresponding xRef16, yRef16 luma location in the reference layer picture is derived in fractional units relative to the top-left sample of the reference layer picture, using phase shifts signaled in the bitstream to derive luma values at each of the xP, yP luma locations in the enhancement layer picture based on the luma values at each of the corresponding xRef16, yRef16 locations in the reference layer picture; and deriving the current picture in the second coding layer.

2. The method of claim 1, wherein the location offset values when present are signaled in a pps_multilayer_extension syntax.

3. The method of claim 1, wherein the deriving of the current picture comprises, a RefLayerPicWidthInSamplesY that specifies a width of the first layer picture in units of luma samples, a RefLayerRegionWidthInSamplesY that specifies a width of the first layer reference region in units of luma samples, wherein RefLayerRegionWidthInSamplesY=RefLayerPicWidthInSamplesY−ref_layer_left_offset−ref_layer_right_offset.

4. The method of claim 1, wherein the deriving of the current picture comprises:

a RefLayerPicHeightInSamplesY that is equal to a height of the first layer picture in units of luma samples;

a RefLayerRegionHeightInSamplesY that is equal to a height of the first layer reference region in units of luma samples, wherein RefLayerRegionHeightInSamplesY=RefLayerPicHeightInSamplesY−ref_layer_top_offset−ref_layer_bottom_offset.

5. The method of claim 1, wherein the deriving of the current picture comprises, a RefLayerPicWidthInSamplesY that specifies a width of the first layer picture in units of luma samples, a RefLayerRegionWidthInSamplesY that specifies a width of the first layer reference region in units of luma samples; and wherein RefLayerRegionWidthInSamplesY=RefLayerPicWidthInSamplesY−ref_layer_left_offset−ref_layer_right_offset.

6. A video coding method implemented in a scalable video coding system for deriving a current picture in a bitstream of coded pictures, the method comprising:

receiving location offset values signaled in a bitstream syntax at the picture level in said bitstream, the location offset values including:

a location offset value specifying at least one of a horizontal offset or vertical offset between a top-left luma sample of a reference region of a decoded reference picture and a top-left luma sample of said decoded reference picture, and a location offset value specifying at least one of a horizontal offset or vertical offset between a bottom-right luma sample of a reference region of the decoded reference picture and a bottom-right luma sample of said decoded reference picture, wherein the location offset values are signaled at the picture level for adaptability per picture, applying to all slices in the current picture for which they are signaled;

parsing the bitstream syntax to determine the location offset values applicable to all slices in the current picture for which they are signaled, using said location offset values to determine a width and height of the reference region in the decoded reference picture;

deriving an inter-layer reference picture from said decoded reference picture said derivation using the width and height of the reference region determined from said location offsets signaled in the bitstream on the picture level for deriving each of a plurality of sample values for inter-layer prediction of the inter-layer reference picture; and deriving the current picture using the inter-layer picture.

7. The video coding method of claim 6, wherein the location offset values when present are signaled in a pps_multilayer_extension syntax.

8. The video coding method of claim 6, wherein a plurality of decoded reference pictures are used to derive the inter-layer reference picture.

9. The video coding method of claim 6, wherein a corresponding sample location in the first coding layer is computed for signaling in the bitstream based on a sample location in the second coding layer.

10. The video coding method of claim 8, wherein at least one of the one or more additional reference pictures is a reference picture from the same coding layer as the current picture.

\* \* \* \* \*

UNITED STATES PATENT AND TRADEMARK OFFICE
CERTIFICATE OF CORRECTION

PATENT NO. : 10,785,492 B2
APPLICATION NO. : 14/727827
DATED : September 22, 2020
INVENTOR(S) : Koohyar Minoo, David M. Baylon and Ajay Luthra Page 1 of 1

It is certified that error appears in the above-identified patent and that said Letters Patent is hereby corrected as shown below:

In the Specification

Column 4, Lines 13-14: Replace "h[0,p],h[n;p]" with --h[0,p],...,h[n;p]--

Column 4, Line 22: Replace "h[n,1],h[n,p-1]" with --h[n,1],...,h[n,p-1]--

Column 5, Line 53: Replace "HEYC" with --HEVC--

Column 7, Line 13: Replace "ref_layer horizontal_delta" with --ref_layer_horizontal_delta--

Column 7, Line 42: Replace "..._phase chroma" with --...phase_chroma--

Column 11, Line 43: Replace "..._left phase chromaposition" with --..._left_phase_chromaposition--

Column 12, Line 32: Bold "503"

Column 13, Line 62: Replace "...(ScaleFactorY (..." with --...(ScaleFactorY*(...--

Column 13, Lines 62-63: Replace "...<<1 scaled..." with --...<<1-scaled...--

Column 14, Line 1: Replace "...) (RefLayer..." with --...)-(RefLayer...--

In the Claims

Column 16, Line 46: Delete "layer"

Column 16, Line 56: Delete "picture"

Signed and Sealed this
First Day of October, 2024

Katherine Kelly Vidal
*Director of the United States Patent and Trademark Office*